Patented Nov. 28, 1939

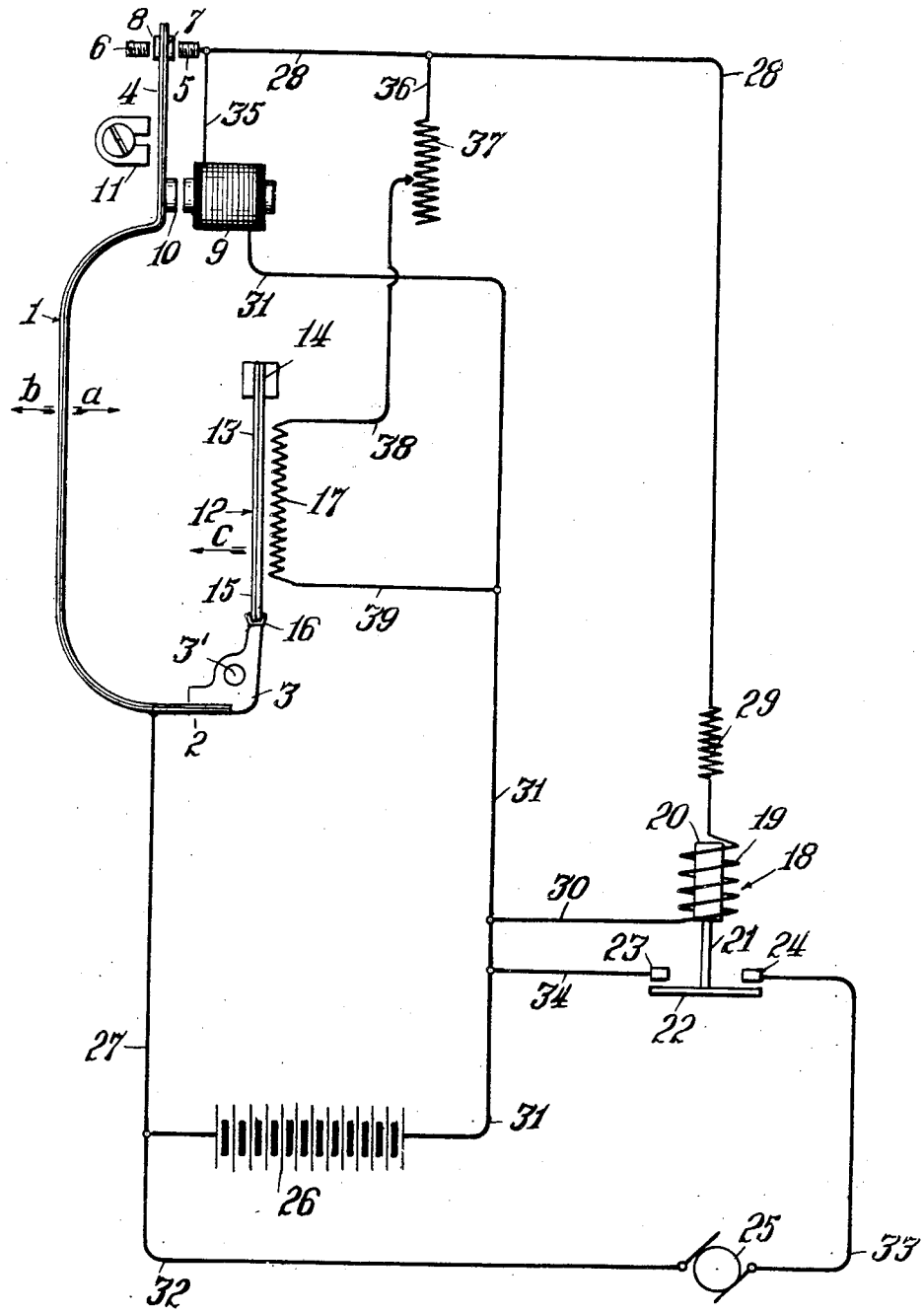

2,181,606

UNITED STATES PATENT OFFICE 2,181,606

THERMOSTATIC CONTROL MECHANISM

Paul B. Parks, Oak Park, Ill., assignor to Vapor Car Heating Company, Inc., Chicago, Ill., a corporation of New York Application September 20, 1937, Serial No. 164,782

9 Claims. (Cl. 236—68)

This invention relates to certain new and useful improvements in a thermostatic control mechanism, more particularly to improved means for yieldably holding a bi-metallic thermostatic member in circuit-closing position for a substantially predetermined length of time to prevent chattering at the switch contacts.

Certain types of thermostatic mechanisms comprise a bi-metallic bar which is substantially fixed at one end, the other end being movable as the bar warps in one direction or the other in response to temperature changes to which it is subjected. In one or both of its extreme positions this bar will close a switch or switches thereby controlling the means for regulating the temperature in the space where the thermostat is located. It will be understood that a very slight change of temperature, or jars or shocks to which the thermostat is subjected, will serve to separate the switch contacts or rapidly make and break the circuit, and it is desirable to provide a holding means to hold the switch contacts in engagement for a certain length of time, once the circuit has been completed. Suitably positioned permanent magnets have been used for this purpose, one of these magnets holding the bar in switch-closing position until a sufficient stress has been developed in the bar (due to temperature changes) to overcome the attraction of the magnet and snap the contacts apart.

According to the present invention an electromagnet is used for this purpose, the electromagnet when energized attracting the movable end portion of the thermostatic bar and holding the switch in closed position. The energizing circuit for the electro-magnet is closed by the switch which also closes the circuit for controlling the temperature regulating mechanism. There is also an electrically operated means, preferably an electric heating element used in conjunction with a thermostatic bar, which is adapted to impart a force to the main thermostatic bar in opposition to the attraction of the magnet and in a direction tending to open the switch. The energizing circuit for this means or electric heater is also closed by the switch already referred to. As a consequence, when the switch is once closed it will be held closed by the electromagnet but a force will be gradually developed opposing the magnetic attraction and tending to open the switch, and when this force plus the response of the main thermostatic member to temperature changes in the space is sufficient to overcome the attraction of the magnet the main switch will be snapped open.

The principal object of this invention is to provide an improved thermostatic control mechanism of the type briefly described hereinabove and disclosed more in detail in the specifications which follow.

Another object is to provide an improved form of holding means for a bi-metallic thermostat.

Another object is to provide improved means for holding a thermostatically controlled switch in closed position for a substantially predetermined length of time.

Other objects and advantages of this invention will be more apparent from the following detailed description of one approved form of apparatus constructed and operating according to the principles of this invention.

The accompanying drawing is a wiring diagram, including the principal elements of the combination shown diagrammatically.

The main bi-metallic thermostatic bar 1 has its end 2 secured to an anchoring member 3. Actually this anchoring member 3 is pivoted at 3' and is movable to bodily adjust the position of thermostat 1, but for the present we will consider member 3 and the end 2 of the thermostat as substantially fixed. As this thermostatic bar 1 is subjected to atmospheric temperature changes it will warp or bend in one direction or the other so as to move the upper free end 4 of the bar between the fixed abutments 5 and 6. While the bar might be constructed to bend in either direction in response to a rise in temperature, we will assume for the purposes of the present discussion that bar 1 swings in a clockwise direction or in the direction of the arrow $a$ when the temperature rises in the space where the thermostat is located, and that the bar swings in the opposite direction or in the direction indicated by arrow $b$ when the temperature falls.

A movable contact member 7 is carried by the upper end portion 4 of bar 1 so as to engage the fixed contact 5 when the temperature rises to a certain predetermined maximum, the contacts 5 and 7 comprising a switch for closing certain circuits as hereinafter described. It will be understood that another switch could be closed at a predetermined minimum temperature by the engagement of contact 8 with the other fixed contact 6. However, in the present disclosure only the one switch 5—7 is utilized. It will be understood that the contacts 5 and 6, while described as fixed, could be adjustably positioned so as to regulate the temperatures at which the thermostat will function.

At 9 is indicated an electro-magnet adapted to attract an armature 10 positioned on bar 1 and hold the switch contacts 5 and 7 in engagement. At 11 is indicated a permanent magnet adapted to attract the upper end portion of bar 1 when swung in the opposite direction so as to yieldably hold the bar in engagement with the other abutment 6.

At 12 is indicated generally a suitable electrically operated means adapted to exert a force on bar 1 in opposition to the attraction of electro-magnet 9 so as to assist the temperature response of thermostat 1 in opening the switch 5—7. In the form here shown, this electrically operated means comprises a second thermostatic bar 13 suitably fixed at one end 14 and having its lower movable end 15 engaged in a yoke 16 fixed on anchorage member 3. At 17 is indicated an electric heating element intimately associated with thermostatic bar 13. Usually this will be in the form of a resistance coil wrapped around the thermostatic bar.

Bar 13 when heated by a current passed through coil 17 will tend to bend so as to swing its lower end 15 in the direction of the arrow c, thus swinging the anchoring member 3 in a counter-clockwise direction and tending to move the main thermostatic bar 1 bodily in the direction of the arrow b or in opposition to the attraction of magnet 9.

The relay indicated generally at 18 comprises a magnetic coil or solenoid 19 adapted, when energized, to draw up the core 20 which through stem 21 lifts contact plate 22 into engagement with the pair of fixed contacts 23 and 24.

This thermostatic assembly may be used to control any suitable heating, cooling, or air-conditioning means. In the example here shown the motor 25 is adapted to actuate a refrigerating mechanism. When the temperature within the space to be cooled rises to a certain predetermined maximum, the thermostatic bar 1 will bend in the direction of the arrow a so as to bring movable switch contact 7 into engagement with fixed contact 5 thus closing the switch and completing the following relay-energizing circuit: From battery or other source of power 26 through wire 27, thermostatic bar 1, switch contacts 7 and 5, wire 28, balancing resistance 29, solenoid coil 19, and wires 30 and 31 back to the battery. The relay when energized will draw up the contact plate 22 so as to complete an energizing circuit for refrigerator-motor 25 as follows: From battery 26 through wire 32, motor 25, wire 33, relay contacts 24, 22 and 23 and wires 34 and 31 back to the source of power.

At the same time the closing of the switch at 5—7 will complete an energizing circuit for the electro-magnet 9 as follows: From battery 26 through wire 27, thermostatic bar 1, switch contacts 7 and 5, wire 35, electro-magnet 9, and wire 31 back to the battery. The energization of electro-magnet 9 will attract the armature 10 and hold the switch closed.

At the same time an energizing circuit for heater 17 will be completed as follows: From the battery 26 through wire 27, thermostat 1, switch contacts 7 and 5, wires 28 and 36, variable resistance 37, wire 38, heating element 17, and wires 39 and 31 back to the battery. It will be understood that by adjusting the variable resistance 37 the strength of the current through heating element 17 may be varied, thus controlling the heat applied to thermostatic bar 13.

As soon as the heater 17 is energized, the heat applied to bi-metallic bar 13 will tend to bend the lower end of this bar in the direction of the arrow c thereby swinging anchoring member 3 in a counter-clockwise direction and tending to swing the thermostatic bar 1 in the direction of the arrow b. It will be seen that this force tends to open the switch 5—7 and is in opposition to the attraction exerted by electro-magnet 9. It will also be understood that the drop in temperature in the space now being cooled by the refrigerating apparatus will also tend to warp or bend the bar 1 in the direction of the arrow b. The temperature applied to the auxiliary heating element 13 is so adjusted that the force applied to bar 1 by this element added to the cooling effect in the space as applied directly to bar 1 will, after a suitable interval of time, be strong enough to overcome the attraction of electro-magnet 9 and swing bar 1 toward the left or in the direction of the arrow b thus breaking the switch contacts 5—7. This will immediately deenergize electro-magnet 9 and also will cut off the current flowing through heating element 17, as well as de-energizing relay 18 and breaking the actuating circuit for refrigerating motor 25.

The thermostatic bar 1 will now swing over against the other fixed abutment 6 and will be held yieldably in this position by the permanent magnet 11. As the heating element 17 and thermostatic bar 13 cool off, the thermostatic bar 13 will tend to resume its original position thus swinging anchoring member 3 in a clockwise direction and relieving the pressure that has been applied to bar 1 in the direction of the arrow b. As the temperature gradually rises in the space, the bar 1 will again tend to warp in the direction of the arrow a and will eventually move contact 7 into engagement with fixed contact 5 again closing the switch and the cycle of operations hereinabove described will be repeated.

It will be apparent that with a system as hereinabove described there can be no chattering or vibration of the fixed contacts. The upper end of the movable bar 4 will be held firmly in switch closing position, once the contact has been made, until sufficient force is generated to overcome the attraction of magnet 9 whereupon the switch will be quickly and decisively snapped open and cannot be again closed until temperature conditions again warrant a starting of the refrigerating apparatus.

It will be quite apparent that by suitably reversing the operation of the main thermostatic member, a heating apparatus could be controlled in the same manner.

A permanent magnet such as 11 might be used in place of the electro-magnet 9, but with less satisfactory results. It will also be understood that the electrically operated mechanism 12 might take various forms, it only being essential that a force be gradually applied to the bar 1 in opposition to the magnet 9. The auxiliary thermostatic bar 13 might be a portion of the main thermostatic bar 1, or might be connected with the main bar in other manners than that here shown.

I claim:

1. In combination, a thermostatic assembly comprising a metallic member movable in one direction or the other in response to atmospheric temperature changes, a switch that is closed by the metallic member when moved to one extreme position, a temperature controlling circuit that is completed or broken by this switch, an electromagnet positioned to attract the metallic member and hold the switch in closed position, an energizing circuit for the electromagnet, an electrically operated means adapted to gradually impart a force to the metallic member tending to move it in opposition to the electromagnet to open the switch, and an energizing circuit for this means, both energizing circuits being completed or broken by the switch.

2. In combination, a thermostatic assembly comprising a metallic member movable in one direction or the other in response to atmospheric temperature changes, a switch that is closed by the metallic member when moved to one extreme position, a temperature controlling circuit that is completed or broken by said switch, an electromagnet positioned to attract the metallic member and hold the switch in closed position, an energizing circuit for the electromagnet, an electric heating element positioned to act on the thermostatic assembly to move the metallic member in opposition to the electromagnet in a direction to open the switch, an energizing circuit for the heating element, the energizing circuits for both the electromagnet and the heating element being completed or opened by the switch.

3. In combination, a thermostatic assembly comprising a metallic member movable in one direction or the other in response to atmospheric temperature changes, a switch that is closed by the metallic member when moved to one extreme position, a temperature controlling circuit that is completed or broken by said switch, an electromagnet positioned to attract the metallic member and hold the switch in closed position, an energizing circuit for the electromagnet, a permanent magnet positioned to yieldably hold the metallic member in its other extreme position with the switch open, an electric heating element positioned to act on the thermostatic assembly to move the metallic member in opposition to the electromagnet in a direction to open the switch, an energizing circuit for the heating element, the energizing circuits for both the electromagnet and the heating element being completed or opened by the switch.

4. In combination, a thermostatic assembly comprising a metallic member movable in one direction or the other in response to atmospheric temperature changes, a switch that is closed by the metallic member when moved to one extreme position, a temperature controlling means, an energizing circuit therefor, a relay adapted to make and break said circuit, an electromagnet positioned to attract the metallic member and hold the switch in closed position, an energizing circuit for the electromagnet, an electric heating element positioned to apply heat to a portion of the thermostatic assembly and move the metallic member in opposition to the electromagnet to open the switch, an energizing circuit for the heating element, and an energizing circuit for the relay, the energizing circuits for the relay, heating element and electromagnet all being completed or broken by the switch.

5. In combination, a thermostatic assembly comprising a metallic member movable in one direction or the other in response to atmospheric temperature changes, a switch that is closed by the metallic member when moved to one extreme position, a temperature controlling means, an energizing circuit therefor, a relay adapted to make and break said circuit, an electromagnet positioned to attract the metallic member and hold the switch in closed position, an energizing circuit for the electromagnet, a permanent magnet positioned to yieldably hold the metallic member in its other extreme position with the switch open, an electric heating element positioned to apply heat to a portion of the thermostatic assembly and move the metallic member in opposition to the magnet to open the switch, an energizing circuit for the heating element, and an energizing circuit for the relay, the energizing circuits for the relay, heating element and electromagnet all being completed or broken by the switch.

6. In combination, a bimetallic thermostatic bar having one relatively fixed end portion and a free end portion movable in opposite directions in response to atmospheric temperature changes, a switch comprising a relatively fixed contact and a contact carried by the free end portion of the thermostatic bar, the switch being closed when the thermostatic bar is in one extreme position, a temperature controlling circuit that is completed or broken by the switch, an electromagnet positioned to attract the metallic bar and hold the switch in closed position, an energizing circuit for the electromagnet, an auxiliary thermostatic bar having a movable portion connected with the relatively fixed end portion of the first mentioned thermostatic bar, an electric heating element positioned to apply heat to the second thermostat and thereby tend to move the first mentioned thermostatic bar in opposition to the electromagnet to open the switch, an energizing circuit for the heating element, the energizing circuits for both the electromagnet and the heating element being simultaneously completed or broken by the switch.

7. In combination, a bimetallic thermostatic bar having one relatively fixed end portion and a free end portion movable in opposite directions in response to atmospheric temperature changes, a switch comprising a relatively fixed contact and a contact carried by the free end portion of the thermostatic bar, the switch being closed when the thermostatic bar is in one extreme position, a temperature controlling circuit that is completed or broken by the switch, an electromagnet positioned to attract the metallic bar and hold the switch in closed position, an energizing circuit for the electromagnet, a permanent magnet positioned to yieldably hold the first mentioned metallic bar in its other extreme position with the switch open, an auxiliary thermostatic bar having a movable portion connected with the relatively fixed end portion of the first mentioned thermostatic bar, an electric heating element positioned to apply heat to the second thermostat and thereby tend to move the first mentioned thermostatic bar in opposition to the electromagnet to open the switch, an energizing circuit for the heating element, the energizing circuits for both the electromagnet and the heating element being simultaneously completed or broken by the switch.

8. In combination, a thermostatic assembly comprising a movable member carrying a contact, a switch comprising the movable contact and a relatively fixed contact, thermostatic means responsive to atmospheric temperature changes for moving the member in one direction or the other to open or close the switch, a temperature controlling circuit that is completed or broken by the switch, means effective only while the switch is closed for holding the contacts in engagement with one another, and means supplemental to the thermostatic means and which becomes effective only after the switch is closed for gradually building up a force in opposition to the first mentioned means for separating the contacts with a snap action.

9. In combination, a thermostatic assembly comprising a movable member carrying a contact, a switch comprising the movable contact and a relatively fixed contact thermostatic means responsive to atmospheric temperature changes for moving the member in one direction or the other to open or close the switch, a temperature controlling circuit that is completed or broken by the switch, electromagnetic means effective only while the switch is closed for holding the contacts in engagement with one another, and means supplemental to the thermostatic means and which becomes effective only after the switch is closed for gradually building up a force in opposition to the electromagnetic means for separating the contacts with a snap action.

PAUL B. PARKS.